United States Patent
Khosravi et al.

(10) Patent No.: US 8,893,112 B2
(45) Date of Patent: Nov. 18, 2014

(54) PROVIDING SOFTWARE DISTRIBUTION AND UPDATE SERVICES REGARDLESS OF THE STATE OR PHYSICAL LOCATION OF AN END POINT MACHINE

(75) Inventors: Hormuzd M. Khosravi, Portland, OR (US); Ajith K. Illendula, Albuquerque, NM (US); Ned M. Smith, Hillsboro, OR (US); Yasser Rasheed, Beaverton, OR (US); Bryan K. Jorgensen, Portland, OR (US); Tracie L. Zenti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1354 days.

(21) Appl. No.: 12/642,911

(22) Filed: Dec. 21, 2009

(65) Prior Publication Data

US 2011/0154316 A1    Jun. 23, 2011

(51) Int. Cl.
*G06F 9/44*     (2006.01)
*G06F 9/445*    (2006.01)

(52) U.S. Cl.
CPC    *G06F 8/665* (2013.01); *G06F 8/61* (2013.01); *G06F 8/65* (2013.01)
USPC ........................................... 717/173; 717/178

(58) Field of Classification Search
CPC .................................... G06F 8/61; G06F 8/65
USPC ................................................. 717/168–178
See application file for complete search history.

(56) References Cited

U.S. PATENT DOCUMENTS 8,295,157 B1 * 10/2012 Pimentel et al. ............. 370/216
2009/0019435 A1 * 1/2009 Piechowski et al. .......... 717/176

FOREIGN PATENT DOCUMENTS

| CN | 101344853 | 1/2009 |
| JP | 2004164115 | 6/2004 |
| JP | 2007334911 | 12/2007 |

OTHER PUBLICATIONS

Velte et al., "Cisco Internetworking with Windows NT & 2000", 2000, Osborne/McGraw-Hill, 458 pages.*
Wolfgang Denk et al., "The DENX U-Boot and Linux Guide (DULG) for canyonlands", Mar. 2009, retrieved from http://www.denx.de/wiki/publish/DULG/DULG-canyonlands.html, 193 pages.*
European Patent Office, European Search Report mailed Jul. 10, 2012 in E.P. patent application No. 10252160.6 (9 pages).
Wikipedia: "Intel Active Management Technology", retrieved from Internet, URL:http:??en.wikipedia.org/w/index.php?title=Intel_Active_Management_Technology&old id=325339173, retrieved on Jun. 28, 2012; Nov. 11, 2009 (6 pages).
Chinese Patent and Trademark Office, Third Office Action mailed Jun. 16, 2014 in Chinese application no. 201010598088.3 (w/English translation)—12 pages.
Chinese Patent and Trademark Office, Second Office Action mailed Nov. 20, 2013 in Chinese application no. 201010598088.3 (w/English translation)—12 pages.

(Continued)

*Primary Examiner* — Ted T Vo
(74) *Attorney, Agent, or Firm* — Trop, Pruner & Hu, P.C.

(57) ABSTRACT

In accordance with some embodiments, software may be downloaded to an end point, even when that said end point is not fully functional. An indication that software is available for distribution may be stored in a dedicated location within a non-volatile memory. That location may be checked for software to download, for example, on each boot up. The software may then be downloaded and verified. Thereafter, the location is marked to indicate that the software has already been downloaded.

29 Claims, 3 Drawing Sheets

(56) References Cited

OTHER PUBLICATIONS

Chinese Patent and Trademark Office, First Office Action mailed Mar. 4, 2013 in Chinese application no. 201010598088.3 (w/English translation)—13 pages.

Chinese Patent and Trademark Office Search Report mailed Feb. 19, 2013 in Chinese application no. 201010598088.3—2 pages.

Chinese Patent and Trademark Office Search Report mailed Oct. 10, 2013 in Chinese application no. 201010598088.3—2 pages.

* cited by examiner

PROVIDING SOFTWARE DISTRIBUTION AND UPDATE SERVICES REGARDLESS OF THE STATE OR PHYSICAL LOCATION OF AN END POINT MACHINE

BACKGROUND

In many cases, it is desirable to provide software to computers after those computers have already been distributed and are in use. This can involve providing additional software or updating existing software.

Sometimes it is difficult and cumbersome to provide new software to existing equipment, commonly called an end point machine. The type of software that may be provided after sale of the equipment may include drivers to provide new services and user applications, middleware, device firmware, and basic input/output systems. The software may be provided by independent software vendors or by other third parties relative to the equipment vendor. Thus, these software vendors desire to provide the software to the end point machine users in the most efficient fashion possible.

DETAILED DESCRIPTION

Figure 1:
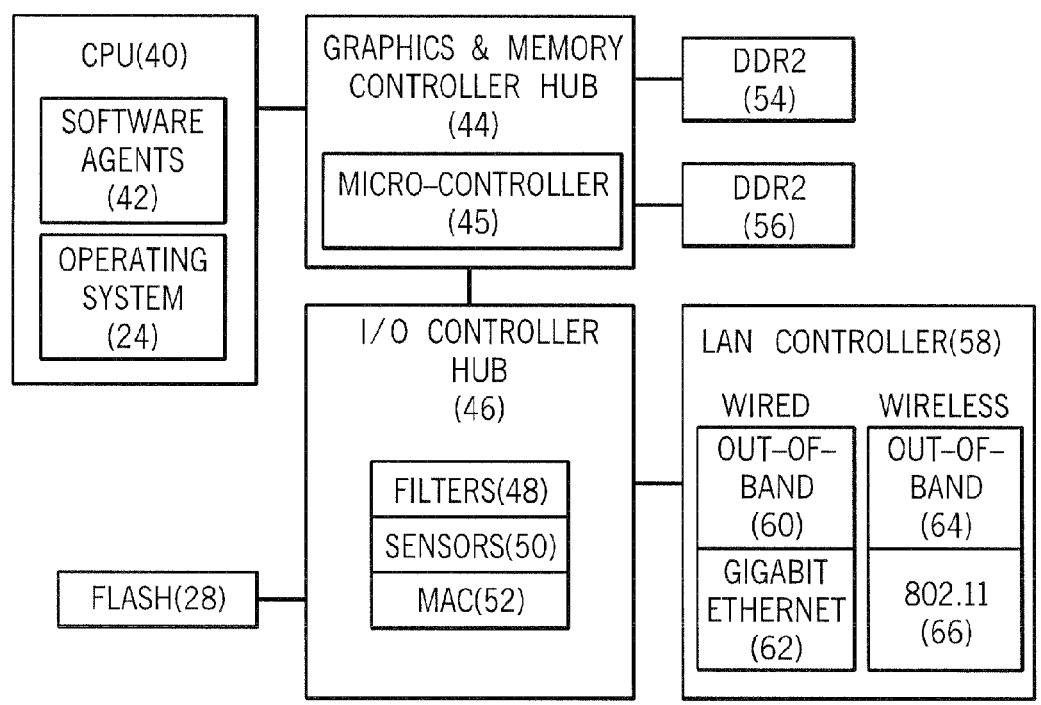
FIG. 1 is a depiction of a hardware architecture in accordance with one embodiment of the present invention for an end point.

FIG. 1 shows a computer system or end point machine that may use software which may need to be updated. For example, an independent software vendor may wish to provide software updates to a large number of such systems that are distributed throughout the world. In addition, it may be desirable to provide additional software in some cases.

Particularly where the system of the type shown in FIG. 1 includes INTEL® Active Management Technology, hardware architecture may be resident in firmware. A microcontroller 45 within a graphics and memory controller hub 44 houses a management engine (ME) firmware to implement various services on behalf of management applications. The non-volatile random access memory 28 houses the system's basic input/output system code used by a management engine and a third party data store (3PDS) that enable applications to store information as needed in non-volatile memory. The memory 28 may be a flash memory in one embodiment.

The INTEL® Active Management Technology (AMT) is a silicon resident management mechanism for remote discovery, healing, and protection of computer systems. It may provide the basis for software solutions to address manageability issues, improve efficiency of remote management and asset inventory functionality and third party management software, safeguard functionality of critical agents from operating system failure, power loss, and intentional or inadvertent client removal.

The management engine, which resides within the microcontroller 45, runs on auxiliary power and is available at all system power states. Thus, the INTEL® AMT technology allows management applications to access client computers, even when they are in a powered off state.

The non-volatile random access memory 28, which stores a third party data storage, may be a highly configurable memory that is both persistent and protected. It provides a non-volatile memory space accessible by manageability applications even when the operating system 24 is unresponsive or management agents are missing. The memory 28 is protected by control mechanisms that use an access control list to enforce access to the space, so only authorized remote devices or applications have access to the data stored there.

In one embodiment, the INTEL® AMT is a component of the INTEL® vPro Workstation Platform of the type shown in FIG. 1. It may include a central processing unit 40, software agents 42, and an operating system 24. The graphics and memory controller hub 44 may be supported by dynamic random access memory 54 and 56, in some embodiments. An I/O controller hub 46 may include filters 48, sensors 50, and a medium access control (MAC) 52 which coupled to the flash memory 28 in one embodiment. A local area network (LAN) controller 58 may be coupled to the hub 46. It may provide for wired local area networks, including an out-of-band connection 60 and a gigabit Ethernet connection 62, as well as wireless out-of-band connectivity 64, and IEEE 802.11 connectivity 66.

Figure 2:
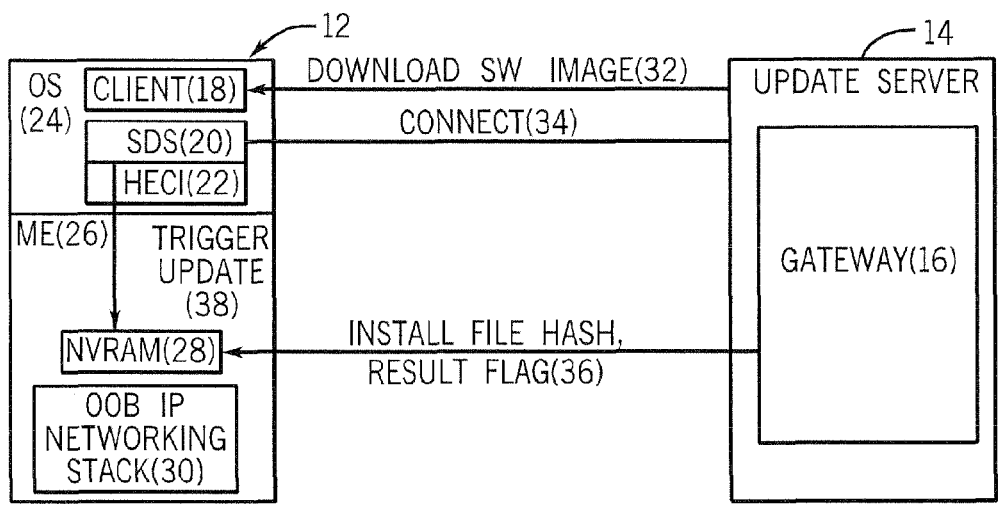
FIG. 2 shows a sequence for distributing software in accordance with one embodiment of the present invention.

In accordance with the first embodiment of the present invention, illustrated in FIG. 2, the INTEL® AMT software package may also include a software distribution service or SDS module 20 on the end point 12 running operating system (OS) 24. The end point 12 may be part of a network 10 also including an update server 14. This module may enable future software installations. The AMT firmware may be configured to allocate specific storage space for software distribution. In one embodiment, this area starts out with no data in it. For example, the 3PDS portion of the non-volatile random access memory 28 can be preconfigured to preserve an area for a given entity, such as an independent software vendor, to work with to define a structure to capture the information necessary for software provisioning.

In one embodiment, the 3PDS portion of the non-volatile random access memory 28 may be provisioned with the correct software distribution information binary large object (BLOB) based on the software distributor's request. The BLOB can be implemented using information exchange servers or any central server on the Internet that works in connection with a software distribution server to get the appropriate provisioning BLOB or information. AMT can connect to this remote provisioning server by default or based on a policy that is worked out with the software update provider. This can happen when the management system first boots up in the system.

Thus, when the system comes up, a host embedded controller interface (HECI) driver checks the 3PDS portion of the non-volatile random access memory 28 to find out if software needs to be provisioned by reading the configured region described above that contains the information BLOB, as indicated at 38. If the answer is yes, the HECI driver 22 triggers the SDS to start the software download process, as indicated at 32.

The SDS 20 queries the 3PDS and connects (over connect 34) to a virtual private network (VPN) software server 14 that has been provisioned in the 3PDS portion of the non-volatile random access memory 28. The SDS module 20 talks to the server 14 and downloads and installs a software client 18 or a barebones installer for the update software, as examples. The SDS verifies the downloaded package with the client 18 using a hash value stored in the 3PDS, as indicated in block 36. The SDS or the update server 14 (for example, the gateway 16) marks the appropriate region in the 3PDS with a flag, indicating that no further download is needed and that the download has been completed, as indicated at 36. When the end user is ready to use the software client 18, the end user can use the already downloaded installer and finish downloading the full package, in some embodiments.

In some embodiments, an extensible mechanism is provided that can work with multiple software vendors. It may also give a choice to an information technology administrator to disable the SDS installation if he does not intend to use the distribution mechanism. In the future, if the customer wants the distribution mechanism, the customer can also start the SDS installer and the whole package can initiate itself.

Figure 3:
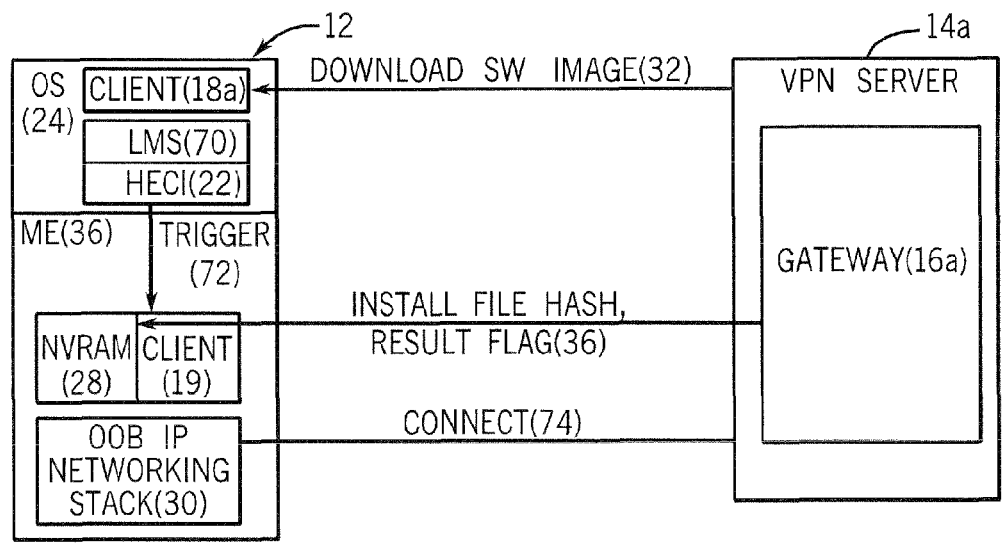
FIG. 3 shows another sequence for distributing software in accordance with another embodiment of the present invention.

In accordance with another embodiment, shown in FIG. 3, a distribution service may be provided to enterprise clients using client initiated remote access (CIRA). Some end points, including those using the INTEL® vPro technology have hardware, software, and firmware components to facilitate the end point's ability to contact the corporate network even if the machine is physically outside the firewall and the end point's host operating system is compromised. These end point technologies rely on a software management presence server (MPS) placed in the enterprise demilitarized zone to broker communications between the end point and the enterprise information technology assets inside the firewalls. Software providers may provide distribution and update services for a variety of software including, as one example, a virtual private network client software to enterprise end points. One implementation, specific to end points located outside the corporate firewall, provides a secure means to do so, while preserving the ability of the information technology administrator to manage software images on its end points.

Thus, referring to FIG. 3, the local manageability service (LMS) 70 may correspond to the SDS 20 of the previous embodiment. The LMS 70 provides the software distribution service functionality on the end point 12. Again, the 3PDS may be part of the non-volatile random access memory 28, providing a data store to store the software distribution BLOB, as described above. An out-of-band Internet networking stack 30 may provide out-of-band communication stack and functionality. It may be the out-of-band channel provided through the AMT firmware in one embodiment. It may implement the CIRA protocol and, in some embodiments, may also implement a virtual private network client and firmware. The server 14a in this embodiment may be a VPN server with a VPN gateway 16a, which may also be a software management present server or MPS. It facilitates software distribution over the Internet.

During the system boot up, the LMS 70 checks for software installation flags in the 3PDS portion of the non-volatile random access memory 28. Based on that flag, the LMS triggers an out-of-band CIRA connection to the remote server 14a, or to an MPS proxy server, that in turn communicates with the server 14a. This may be done using the HECI driver 22 and client 19, as indicated by the trigger arrow 72. The client 19 may be AnyConnect Lite VPN client, available from CISCO Systems, Inc., San Jose, Calif. 95134, in one embodiment. The remote server 14a writes the hash of a software image in the 3PDS for verification, as indicated at 36. The LMS also initiates an in-band, operating system based connection to the remote server, indicated at 74, that provides a software image for distribution. Next, the LMS downloads the software image from the remote server, as indicated at 32, resulting in the client 18a. It validates the image for the software with the hash value stored in the 3PDS to make sure that it is a valid image before it installs the software. Once the download is successful, the LMS or remote server/MPS resets the software install flag in the 3PDS, as indicated by the arrow 36.

The out-of-band communication link may be a management engine based networking stack that works independently of the host operating system stack. Thus the out-of-band communications link allows downloading of software regardless of the power state (on, hibernate, sleep, power down) of the host, regardless of the operating system state (up, down or corrupted) and regardless of host location (inside or outside of the enterprise).

Figure 4:
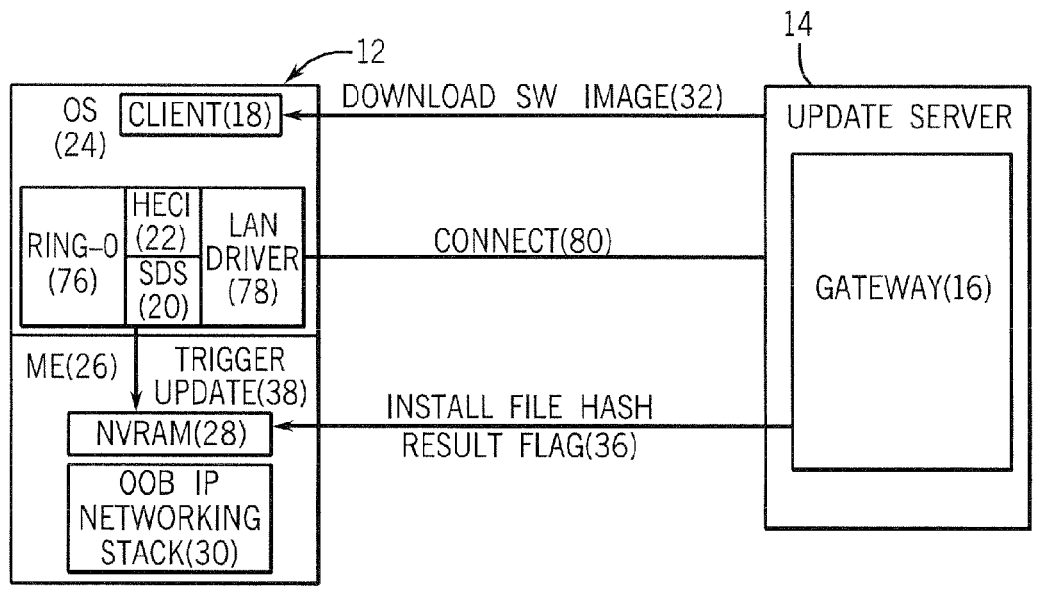
FIG. 4 shows still another embodiment for distributing software in accordance with one embodiment of the present invention.

Referring to FIG. 4, in accordance with still another embodiment, ring zero 76 may be used. That is, the operating system kernel modules and drivers may be used to perform the software distribution functionality. The SDS functionality 20 may be imbedded inside the HECI driver 22, in one embodiment. A local area network/network interface card driver 78 may be used for network communication, in one embodiment over connection 80. The rest of the flow is the same described for FIG. 2, except for using the HECI driver based SDS functionality versus the ring 3 SDS windows service or application.

Thus, in some embodiments, software may be distributed in a way that is independent of the current state or physical location of the platform to receive the software update. The management engine may be used to help with software distribution, providing additional security assurances for software vendors.

Figure 5:
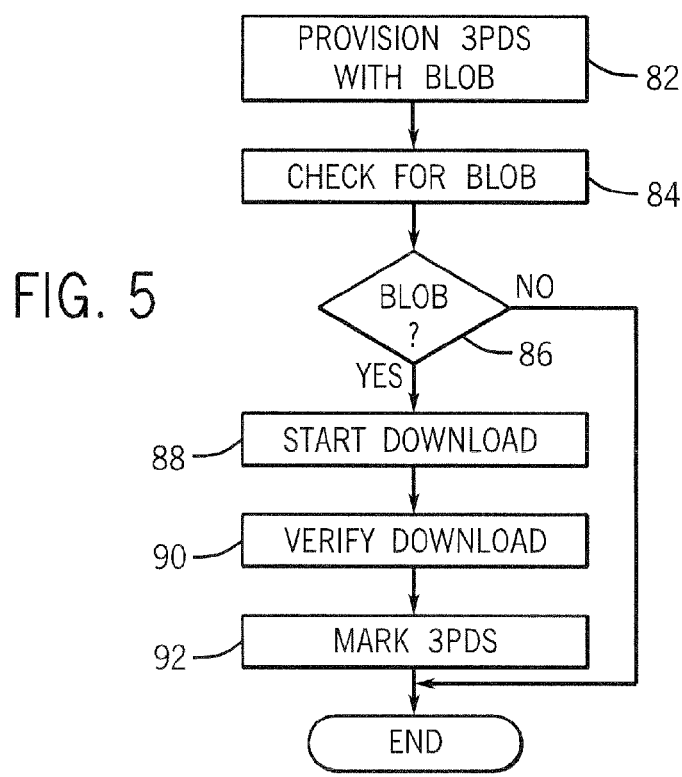
FIG. 5 is a flow chart for one embodiment.

Referring to FIG. 5, a sequence may be implemented in software, hardware, or firmware. In a software implemented sequence, the software may be stored in an optical, magnetic, or semiconductor memory. For example, it can be stored in one of the memories 54 or 56, shown in FIG. 1. The memory may store a sequence of instructions that are executed by a computer, such as the microcontroller 45.

Initially, a check at block 82 determines whether the 3PDS portion of the non-volatile random access memory 28 is provisioned with a BLOB providing an identification of software updates or downloads. Then, typically on boot up, in block 84, a check is made to determine whether there is a BLOB and what the BLOB is. If there is a BLOB and there is no flag set to indicate the software was already downloaded, as determined in diamond 86, a software download is initiated, as indicated in block 88, and, otherwise, the flow ends. The download is verified, as indicated in block 90, and then, in block 92, the BLOB is marked to indicate that the software has been downloaded so that the next time the system starts up, it will not be downloaded again.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   storing an indication in a dedicated location within a non-volatile random access memory on a platform that software is available for downloading to the platform;
   checking said location for software to download;
   downloading said software to said platform; and
   marking said location to indicate said software was downloaded.

2. The method of claim 1 wherein checking said location for software to download includes checking for a binary large object in a dedicated portion of a non-volatile random access memory.

3. The method of claim 2 including identifying the software to be downloaded in said binary large object.

4. The method of claim 3 including verifying said downloaded software.

5. The method of claim 4 including marking the memory with a flag to indicate that the software indicated in the binary large object has been downloaded.

6. The method of claim 2 including provisioning a third party data store with said binary large object.

7. The method of claim 1 including automatically checking for software to download each time a system boots.

8. The method of claim 1 including downloading said software using a client initiated remote access.

9. The method of claim 1 including downloading said software even when said system is compromised.

10. The method of claim 1 including communicating with a remote server for software download over an out-of-band communication link.

11. The method of claim 1 including using ring zero to download said software.

12. A non-transitory computer readable medium storing instructions to enable a computer to:
    establish an out-of-band communication link using a management engine firmware based networking stack; and
    download software to a host regardless of the state of its operating system using said link.

13. The medium of claim 12 further storing instructions to enable software download regardless of the power state of said host.

14. The medium of claim 12 further storing instructions to enable software download regardless of whether the host is inside or outside of an enterprise.

15. The medium of claim 12 further storing instructions to store an indication that software is available for distribution in a dedicated location within a non-volatile random access memory.

16. The medium of claim 15 further storing instructions to check said location for software to download.

17. The medium of claim 16 further storing instructions to download said software and mark said location to indicate said software was downloaded.

18. The medium of claim 15 further storing instructions to check for a binary large object in a dedicated portion of a non-volatile random access memory.

19. The medium of claim 18 further storing instructions to identify the software to be downloaded in said binary large object.

20. The medium of claim 19 further storing instructions to mark the memory with a flag to indicate that the software indicated in the binary large object has been downloaded.

21. An apparatus comprising:
    an out-of-band Internet protocol networking stack; and
    a controller to store an indication that software is available for distribution in a dedicated location within a non-volatile random access memory, to check said location for software to download, to download said software and to mark said location to indicate that said software was downloaded.

22. The apparatus of claim 21 including a non-volatile random access memory including said dedicated location.

23. The apparatus of claim 21 including an out-of-band Internet protocol networking stack to operate independently of an operating system on said apparatus so that said stack is functional even when the operating system is not functional.

24. The apparatus of claim 21, said controller to automatically check for software to download each time the apparatus boots.

25. The apparatus of claim 24, said controller to download software using a client initiated remote access.

26. The apparatus of claim 21, said controller to use a ring zero to download software.

27. The apparatus of claim 21, said apparatus to establish a connection with an update server to download software.

28. The apparatus of claim 21 to download software regardless of the power state of said apparatus.

29. The apparatus of claim 21, said controller to download software regardless of the location of said apparatus with respect to an enterprise.

* * * * *